United States Patent [19]

Iwinski

[11] Patent Number: 5,795,620
[45] Date of Patent: Aug. 18, 1998

[54] RETARDING THE LEACHING OF METAL VALUES FROM WASTE ROCK

[75] Inventor: Steven R. Iwinski, Juneau, Ak.

[73] Assignee: Kennecott Greens Creek Mining Company, Salt Lake City, Utah

[21] Appl. No.: 729,441

[22] Filed: Oct. 11, 1996

Related U.S. Application Data

[60] Provisional application No. 60/005,124 Oct. 12, 1995.

[51] Int. Cl.$^6$ .................... B05D 3/10; B05D 1/36; E01C 11/24
[52] U.S. Cl. .................... 427/136; 427/299; 427/385.5
[58] Field of Search .................... 427/136, 221, 427/302, 299, 393.6, 385.5

[56] References Cited

U.S. PATENT DOCUMENTS

| | | | |
|---|---|---|---|
| 2,981,162 | 4/1961 | Davidson et al. | 427/136 |
| 3,759,197 | 9/1973 | Bracke | 427/136 |
| 4,049,869 | 9/1977 | DeLong | 427/136 |
| 4,341,824 | 7/1982 | Le Grand | 427/136 |
| 4,366,194 | 12/1982 | Pliny et al. | 427/136 |
| 4,432,880 | 2/1984 | Talbot | 210/725 |
| 4,460,625 | 7/1984 | Emmons et al. | 427/136 |
| 4,521,452 | 6/1985 | Highsmith | 427/136 |
| 4,701,264 | 10/1987 | Braun | 210/734 |
| 4,725,451 | 2/1988 | Cripe | 427/136 |
| 4,731,187 | 3/1988 | Moriya et al. | 210/719 |
| 4,758,353 | 7/1988 | Spence et al. | 210/725 |
| 4,861,493 | 8/1989 | Jansen | 210/715 |
| 4,985,276 | 1/1991 | Zeiss et al. | 427/136 |
| 5,063,087 | 11/1991 | Eck et al. | 427/136 |
| 5,091,002 | 2/1992 | Schamberg et al. | 427/136 |
| 5,093,091 | 3/1992 | Dauplaise et al. | 423/112 |
| 5,112,500 | 5/1992 | Jones | 210/728 |
| 5,207,923 | 5/1993 | Wese | 210/727 |
| 5,308,502 | 5/1994 | Brown | 210/724 |

FOREIGN PATENT DOCUMENTS

| | | | |
|---|---|---|---|
| 49-16251 | 4/1974 | Japan | 427/136 |

OTHER PUBLICATIONS

Olice C. Carter, Jr. and B.J. Scheiner, "Removal of Toxic Metals from an Industrial Wastewater Using Flocculants", *Fluid Particle Separation Journal*, 4, pp. 193-196 (1991) (no month).

*Primary Examiner*—Diana Dudash
*Attorney, Agent, or Firm*—Whyte Hirschboeck Dudek S.C.

[57] ABSTRACT

The leaching of metals from waste rock is retarded by coating the waste rock with a polymer that both adheres to the rock and chemically binds with the leaching metals. In some cases, the pH of the waste rock environment must be increased prior to polymer treatment with an addition of a neutralizing agent such as lime. Specifically, this neutralizing agent raises the pH of the waste rock environment thereby allowing the polymer to hold this neutralizing agent within the waste rock.

4 Claims, 2 Drawing Sheets

RETARDING THE LEACHING OF METAL VALUES FROM WASTE ROCK

This application claims the benefit of U.S. Provisional Application No. 60/005,124 filed Oct. 12, 1995.

BACKGROUND OF THE INVENTION

1. Field of the Invention

This invention relates to a method of treating waste rock. In one aspect, the invention relates to a method of treating waste rock containing metal values, while in another aspect the invention relates to treating the waste rock with a polymer comprising pendent carboxylate groups. In yet another aspect, the invention relates to a method of stabilizing the waste rock by holding hydroxinated compounds in the waste rock via the polymer.

2. Description of the Prior Art

The acidity and metal values that result from water passing over sulfide-containing waste rock is a recognized environmental problem. This water is known as acid rock drainage (ARD). ARD is the result of oxidation of sulfidic material (usually iron, zinc or lead sulphides) in the presence of moisture which then results in the formation of sulfuric acid and the solubilization of the metal values contained in the waste rock. Specifically, metal values such as iron, zinc, lead, etc., solubilize and leach from the waste rock into the surrounding soil and ground water which in turn can cause destruction of the indigenous flora and fauna.

Existing technology for addressing the problems associated with the leaching of metals from waste rock include attempts to raise the pH of the water system, providing a base buffering system within the waste rock, and/or restricting air and water contact with the waste rock.

SUMMARY OF THE INVENTION

According to this invention, the leaching of metals other than strontium from waste rock is retarded by coating the waste rock with a polymer that both adheres to the rock and chemically binds with the leaching metals. In some cases, the pH of the waste rock environment must be increased prior to polymer treatment with an addition of a neutralizing agent such as lime. Specifically, this neutralizing agent raises the pH of the waste rock environment thereby allowing the polymer to hold this neutralizing agent within the waste rock. Polymers useful in this invention are typically anionic polymers having high molecular weights and containing pendent carboxylate functionality.

DETAILED DESCRIPTION OF THE INVENTION

Figure 1:
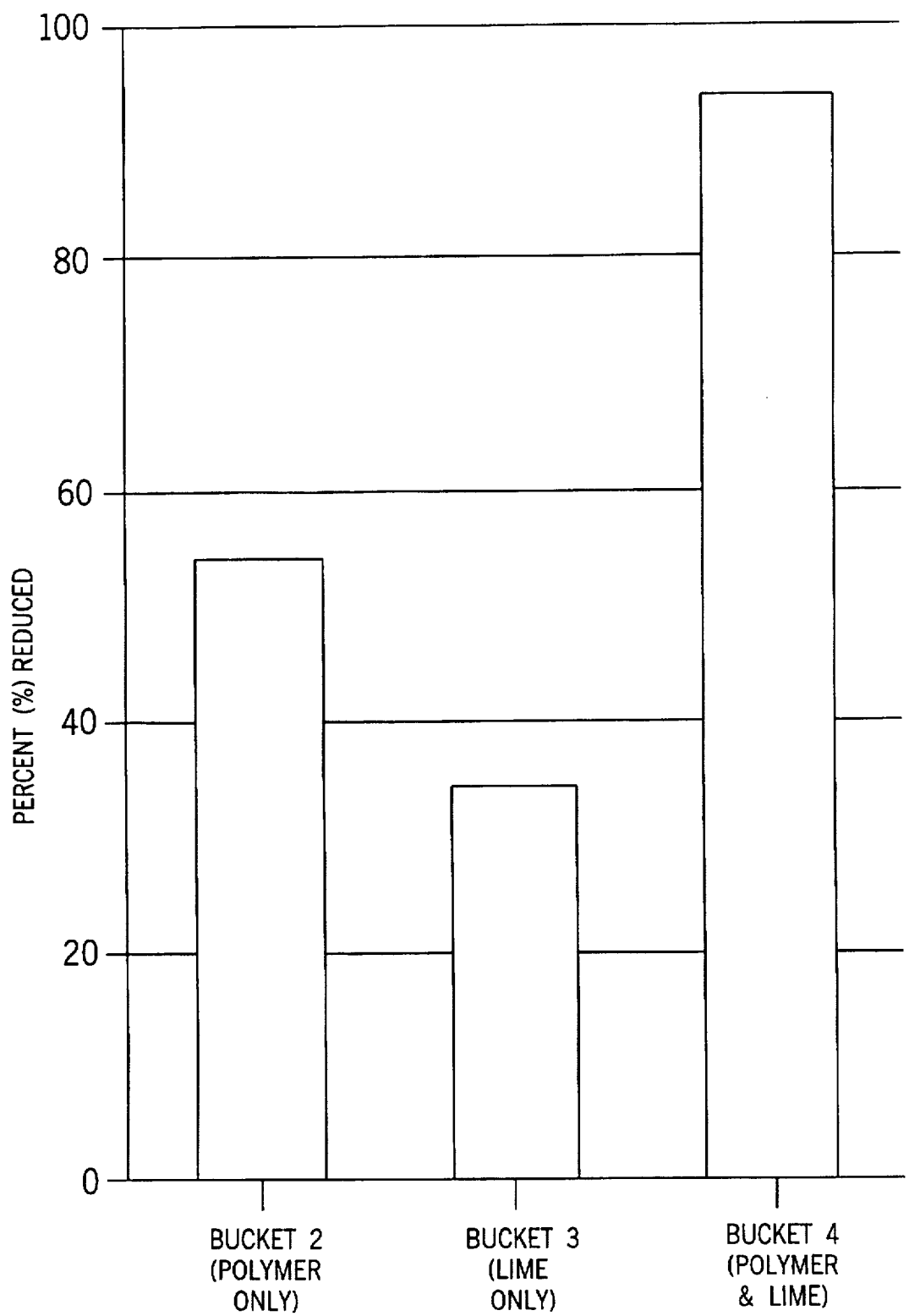
FIG. 1 reports the comparative test data of Example 4 regarding the reduction of zinc (1%) versus control after 13 months.

As here used, "waste rock" means any soil or rock waste at any stage of oxidation that is associated with a mining operation. Leachates of low pH and/or metals from these mining operations can contaminate overburden, spoil and soil with leached acid and metals. Contamination of soil or rock waste is typically site specific and refers to any elevation above the existing background levels of metals found naturally in the soil or rock waste. "Metal values" means the leachable metal content of the waste rock, and includes all cationic metals such as iron, zinc, lead, copper, magnesium, manganese, calcium etc.

The polymer of this invention is an anionic copolymer comprising units derived from acrylic acid and acrylamide, or a modified polyacrylamide polymer that is grafted with acrylate units. Typically, the anionic portion of the polymer comprises at least about 15%, preferably at least about 40%, and more preferably at least about 70% units derived from acrylic acid or one or more acrylates. The maximum amount of such units in the polymer usually does not typically exceed about 40%, preferably it does not exceed about 70%, and more preferably it does not exceed about 90%.

Typically, the polymer comprises at least about 10%, preferably at least about 30%, and more preferably at least about 60% units derived from acrylamide. The maximum of such units on the polymer usually does not typically exceed about 85%, preferably it does not exceed about 60%, and more preferably it does not exceed about 20%.

Representative polymers that can be used in the practice of this invention include Anco PHPA (37–40% acrylate), SDF 4000 Plus (37–40% acrylate), SDF 2000 (18–20% acrylate), SDF Sum-Vis-Plus (100% acrylate), Alcomer 120L (18–20% acrylate), WDS 550X (35–38% acrylate), Soil Fix IR (15–20% acrylate), Percol E-10, Percol E-24, Percol 155, Percol 1011 (15–20% acrylate), and Percol 156, all manufactured by Allied Colloids; and Super Floc A-836 (15–20% acrylate) and Super Floc A-866 available from Cytec Industries.

In order for the leached metal values to chemically adsorb or bind to the active sites in the polymer, the pH of the waste rock environment must be above about 5.0, and preferably above about 7. If the pH of the environment is less than about 5.0, the waste rock is first treated with a neutralizing agent, e.g. lime, so that the pH of the environment rises to at least about 5.0.

The waste rock can be treated with the anionic polymer and the neutralizing agent, if any, by any conventional technique. Typically, the method of application will depend on, among other things, the size of the waste rock heap or collection requiring treatment. For example, on an industrial scale, the polymer and neutralizing agent can be applied onto the waste rock by spraying and/or pressure injection. Although not typical, physical blending of the waste rock using mechanical equipment may become necessary to enhance the coating process. The overall volume and concentration of polymer required to coat the waste rock will vary depending on the actual metal content of the waste rock.

The invention is further described by the following Examples. These examples were designed to mimic the natural conditions, e.g. rain, snow, run-off, etc., that cause the erosion of metal values from waste rock, both treated and untreated. Unless otherwise indicated, all parts and percentages are by weight.

SPECIFIC EMBODIMENTS

Example 1

Waste rock (110 lbs./column) that was in the beginning stages of oxidation (e.g. 10–15% oxidized) and had a pH of about 7 was used for this example. This waste rock was treated in one of three ways and then placed into four separate polyvinyl chloride (pvc) pipe columns measuring 5 feet in length and 6 inches in diameter. Column 1 was a control and contained untreated waste rock. Columns 2–4 were embodiments of this invention and contained waste rock that was treated with differing concentrations of a polymer solution. The polymer solution was comprised of equal quantities of 40% polyacrylamide Polymer (SDF 4000) and 100% Polyacrylic Polymer (sodium acrylate). Column 2 contained waste rock that was treated with 0.172 lb polymer/ton waste rock, and Columns 3 and 4 contained waste rock that was treated with 0.495 lb polymer/ton waste rock.

Specifically, the waste rock was placed in a rotary agglomerator and then sprayed with the desired concentration of a polymer solution while being rotated to ensure thorough mixing of the polymer and waste rock. Once thoroughly mixed, the waste rock was loaded into the appropriate polyvinyl chloride (pvc) pipe column.

De-ionized water was dripped over Columns 1–3 and de-ionized water that had been adjusted to pH 2.5 with sulfuric acid was dripped over Column 4; all at a rate of 6 liters per week. The leachates were collected weekly and analyzed for various parameters. The data are reported in Table I.

TABLE I

Leachate Chemistry of Columns 1–4

| Day | pH | Sulfate Depletion (mg/kg) | Magnesium Concentration (mg/L) | Calcium Concentration (mg/L) | Zinc Concentration (mg/L) |
|---|---|---|---|---|---|
| Column 1 (Untreated) | | | | | |
| 7 | 6.83 | 184 | 139 | 423 | 228 |
| 14 | 6.86 | 105 | 34 | 213 | 90 |
| 21 | 6.95 | 81 | 32 | 177 | 69 |
| 28 | 6.91 | 86 | 40 | 240 | 92 |
| 35 | 7.14 | 95 | 27 | 96 | 44 |
| 42 | 7.38 | 68 | 27 | 102 | 45 |
| 49 | 7.00 | 49 | 27 | 118 | 44 |
| 56 | 7.16 | 55 | 36 | 145 | 54 |
| Column 2 (Treated with 0.172 lb Polymer/Ton.) | | | | | |
| 7 | 7.22 | 110 | 53 | 284 | 108 |
| 14 | 7.24 | 102 | 52 | 143 | 70 |
| 21 | 7.33 | 62 | 37 | 87 | 34 |
| 28 | 7.31 | 60 | 52 | 130 | 56 |
| 35 | 7.51 | 71 | 40 | 88 | 25 |
| 42 | 7.39 | 70 | 38 | 90 | 26 |
| 49 | 7.32 | 20 | 27 | 60 | 17 |
| 56 | 7.53 | 24 | 27 | 60 | 17 |
| Column 3 (Treated with 0.495 lb Polymer/Ton) | | | | | |
| 7 | 7.24 | 113 | 70 | 357 | 100 |
| 14 | 7.23 | 91 | 55 | 174 | 69 |
| 21 | 7.35 | 74 | 40 | 97 | 33 |
| 28 | 7.31 | 61 | 49 | 139 | 51 |
| 35 | 7.43 | 70 | 40 | 87 | 21 |
| 42 | 7.47 | 77 | 38 | 93 | 21 |
| 49 | 7.47 | 27 | 24 | 57 | 13 |
| 56 | 7.59 | 24 | 25 | 57 | 11 |
| Column 4 (Treated with 0.495 lb. Polymer/Ton) | | | | | |
| 7 | 7.26 | 120 | 59 | 342 | 100 |
| 14 | 7.25 | 112 | 55 | 180 | 74 |
| 21 | 7.34 | 74 | 61 | 144 | 53 |
| 28 | 7.20 | 90 | 68 | 189 | 67 |
| 35 | 7.37 | 87 | 63 | 142 | 38 |
| 42 | 7.41 | 75 | 62 | 149 | 37 |
| 49 | 7.39 | 49 | 47 | 107 | 25 |
| 56 | 7.47 | 49 | 51 | 117 | 23 |

These data demonstrate that sulphate is depleted from waste rock at a slower rate after treatment with the polymer solution. This sulphate depletion is directly related to the leaching of metals. Specifically, these data demonstrate that the leaching of metals from waste rock is greatly decreased after treatment with the polymer solution.

These data also demonstrate the pH levels of treated and untreated columns during the sampling period and specifically indicate that the polymer mitigates acid generation.

Example 2

Massive argillite having a zinc concentration of 0.6% and a pH of between about 7.4 and 8.4 was placed into two separate glass columns. One of the columns was treated with a polymer solution (500 ml of a 0.002% concentration of 17 million molecular weight polyacrylamide with 37–40% of the molecular weight comprised of sodium acrylate); the other column acted as a control. Specifically, the polymer solution was poured through the treated column one time to coat and bind the metals contained in the massive argillite. The column was then purged one time with tap water to remove any residue polymer from the massive argillite. Tap water containing 0.08 mg/l zinc (500 ml) was poured into both columns until a saturation level was reached. After saturation, the water was replaced once or twice a week and then analyzed for zinc concentrations. The data are reported in Table II.

TABLE II

Massive Argillite Treatment Test

| Day | Treated Zinc Concentration (mg/l) | Untreated Zinc Concentration (mg/l) | Day | Treated Zinc Concentration (mg/l) | Untreated Zinc Concentration (mg/l) |
|---|---|---|---|---|---|
| 1 | 0 | 0.35 | 20 | 0.08 | 0.21 |
| 2 | 0 | 0.31 | 27 | 0.08 | 0.18 |
| 3 | 0 | 0.29 | 34 | 0.07 | 0.17 |
| 6 | 0 | 0.22 | 41 | 0.07 | 0.15 |
| 7 | 0 | 0.22 | 48 | 0.07 | 0.18 |
| 8 | 0.01 | 0.19 | 55 | 0.08 | 0.21 |
| 9 | 0.02 | 0.18 | 62 | 0.08 | 0.14 |
| 10 | 0.02 | 0.17 | 69 | 0.08 | 0.12 |
| 13 | 0.07 | 0.22 | 76 | 0.09 | 0.17 |
| 14 | 0.08 | 0.2 | 83 | 0.08 | 0.17 |
| 15 | 0.09 | 0.2 | 90 | 0.07 | 0.15 |
| 16 | 0.08 | 0.2 | 97 | 0.08 | 0.16 |
| 17 | 0.08 | 0.19 | 105 | 0.08 | 0.14 |

These data demonstrate that the leaching of zinc from the massive argillite is greatly decreased after treatment with the polymer solution.

Example 3

A drainage hole was drilled in the bottom of two 5 gallon buckets, and a piece of porous foam (4.5" thick) was placed over the hole. The buckets were then filled with 2.5 gallons of waste rock. This waste rock had been exposed to the environment for approximately 4 years and was in the beginning stages of oxidation (e.g. 10–15% oxidation). In addition, the waste rock had a zinc concentration of about 3–12% and a pH of about 2.5.

Bucket 1 was a control that was treated with de-ionized water only (1.5 L). Bucket 2 was an embodiment of this invention and was treated with a lime solution having a concentration of 200 g/L (1.5 L) prior to the treatment with the polymer solution. The polymer solution was comprised of equal quantities of 40% Polyacrylamide Polymer (SDF 4000) and 100% Polyacrylic Polymer (sodium acrylate).

After the above treatments, the two buckets of waste rock were tested regularly for the liberation of metals.

Specifically, de-ionized water (500 ml) was poured into each bucket such that all of the waste rock was exposed to the water. Sample effluents were collected from each bucket and tested for pH, temperature, and concentration of dissolved zinc. The data are reported in Table III.

TABLE III

Leachate Chemistry of the Control and an Embodiment of this Invention

| | Bucket 1 (Control) | | Bucket 2 (Invention) | |
|---|---|---|---|---|
| Day | pH | Zn Concentration (mg/L) | pH | Zn Concentration (mg/L) |
| 0 | n/a | n/a | n/a | n/a |
| 28 | 2.12 | 326 | 11.72 | 0.10 |
| 33 | 1.84 | 265 | 11.99 | 0.18 |
| 37 | 1.75 | 208 | 11.80 | 0.12 |
| 42 | 1.74 | 194 | 12.25 | 0.33 |
| 46 | 1.66 | 67 | 11.80 | 0.14 |
| 49 | 1.5 | 111 | 12.23 | 0.07 |
| 53 | 2.03 | 115 | 11.68 | 0.14 |
| 57 | 2.24 | 78 | 11.55 | 0.18 |
| 60 | 2.10 | 101 | 11.45 | 0.14 |
| 62 | 2.25 | 59 | 11.43 | 0.14 |
| 64 | 1.79 | 79 | 12.01 | 0.16 |
| 67 | 2.23 | 51 | 12.06 | 0.16 |
| 69 | 2.04 | 62 | 12.38 | 0.12 |
| 75 | 2.02 | 64 | 12.16 | 0.12 |
| 78 | 1.99 | 59 | 12.39 | 0.12 |
| 82 | 2.05 | 57 | 12.10 | 0.16 |
| 85 | 2.06 | 74 | 12.08 | 0.12 |
| 89 | 2.09 | 61 | 12.20 | 0.20 |
| 92 | 2.18 | 63 | 12.40 | 0.18 |
| 97 | 2.11 | 50 | 12.03 | 0.08 |
| 104 | 1.86 | 56 | 12.44 | 0.10 |
| 111 | 1.98 | 69 | 12.20 | 0.10 |
| 116 | 1.01 | 128 | 13.21 | 0.12 |
| 123 | 1.64 | 127 | 12.53 | 0.12 |
| 132 | 1.94 | 106 | 11.49 | 0.12 |
| 139 | 2.03 | 108 | 11.95 | 0.16 |
| 146 | 2.03 | 118 | 11.49 | 0.16 |
| 153 | 2.18 | 116 | 11.92 | 0.14 |
| 160 | 1.96 | 177 | 11.94 | 0.16 |
| 167 | 1.93 | 199 | 12.01 | 0.16 |
| 174 | 2.17 | 212 | 12.01 | 0.12 |
| 181 | 2.13 | 210 | 12.04 | 0.10 |
| 188 | 2.81 | 232 | 11.97 | 0.16 |
| 203 | 2.27 | 206 | 11.96 | 0.13 |
| 210 | 1.88 | 248 | 12.13 | 0.18 |
| 216 | 0.86 | 366 | 11.22 | 0.08 |
| 236 | 2.07 | 258 | 12.44 | 0.12 |
| 244 | 1.87 | 180 | 11.51 | 0.02 |
| 257 | 1.96 | 290 | 11.32 | 0.04 |
| 271 | 2.36 | 200 | 11.52 | 0.08 |
| 297 | 2.36 | 324 | 10.82 | 0.08 |
| 311 | 2.24 | 290 | 11.12 | 0.04 |
| 321 | 2.69 | 332 | 10.90 | 0.02 |
| 334 | 2.20 | 382 | 11.38 | 0.04 |
| 353 | 2.33 | 514 | 10.83 | 0.08 |
| 372 | 2.35 | 752 | 12.12 | 0.11 |
| 402 | 2.18 | 2448 | 12.05 | 0.08 |
| TOTALS | | 10792 | | 5.77 | n/a = Not Analyzed

These data illustrate the feasibility and benefit of treating waste rock having a pH of less than about 5.0 with a neutralizing agent prior to treatment with the polymer solution. These data also demonstrate the decrease in the leaching of zinc values from the waste rock after treatment with the neutralizing solution and the polymer.

Example 4

A drainage hole was drilled in the bottom of four 5 gallon buckets, and a piece of porous foam (4.5" thick) was placed over the hole. The buckets were then filled with 2.5 gallons of waste rock. This waste rock had been exposed to the environment for approximately 10 years and was in the advanced stages of oxidation (e.g. 90% oxidation). In addition, the waste rock had a zinc concentration of about 3–12% and a pH of about 2.5.

Bucket 1 was a control that was treated with de-ionized water only. Bucket 2 was a control that was treated with the polymer solution alone. Bucket 3 was also a control that was treated with only a neutralizing solution; namely a lime solution. Finally, Bucket 4, an embodiment of this invention, was treated with the lime solution prior to the treatment with the polymer solution.

Equal quantities (3 L each) of a lime solution (200 g/L) and a polymer solution (0.5 g/L) were prepared. The polymer solution was comprised of equal quantities of 40% Polyacrylamide Polymer (SDF 4000) and 100% Polyacrylic Polymer (sodium acrylate).

The lime solution (1.5 L) was poured into Buckets 3 and 4. After the two buckets drained, the polymer solution (1.5 L) was then added to Buckets 2 and 4. Bucket 1 was treated with de-ionized water only (1.5 L).

Figure 2:
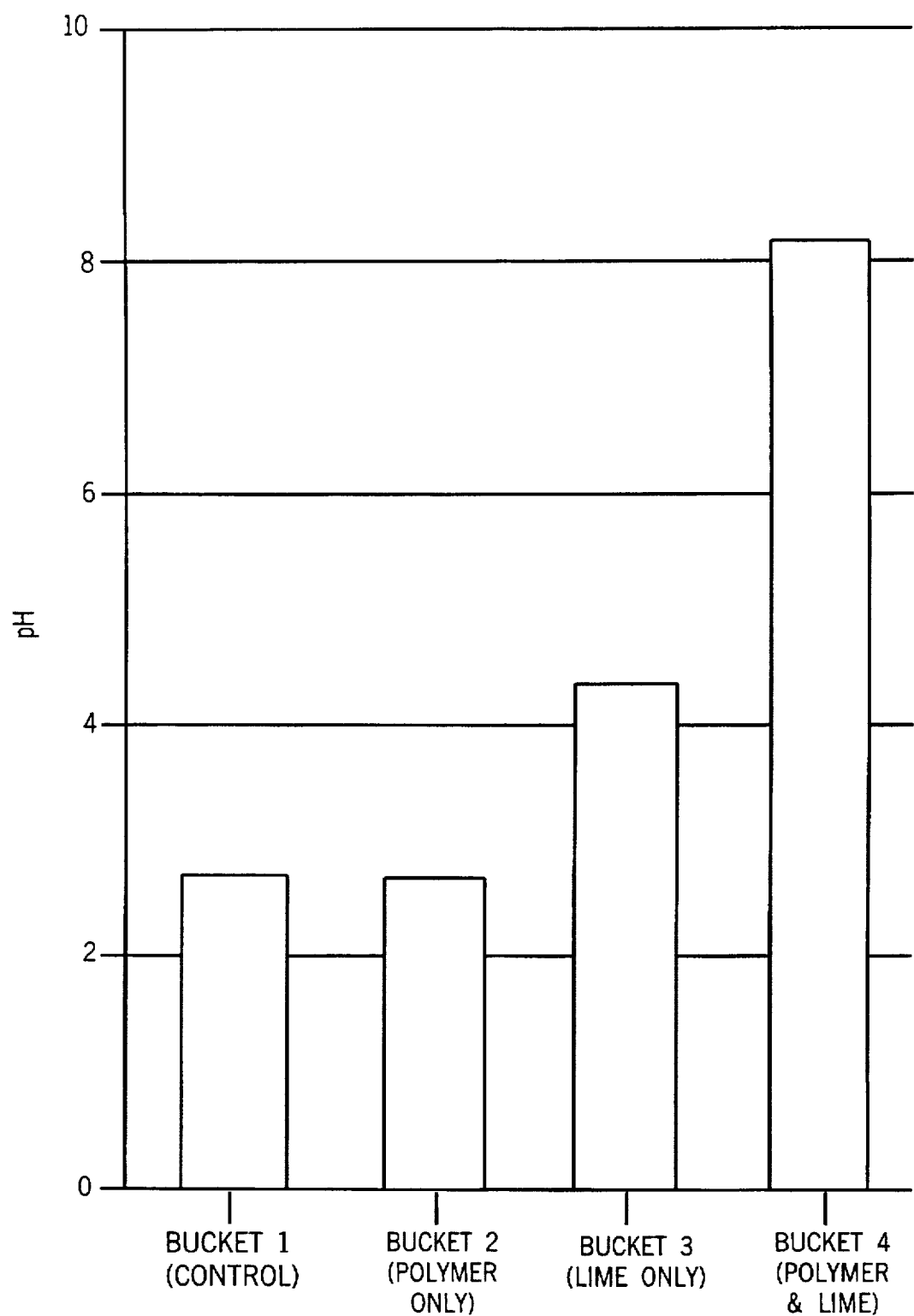
FIG. 2 reports the comparative test data of Example 4 regarding the pH values after 13 months.

After the above treatments, the four buckets of waste rock were tested regularly for the liberation of metals. Specifically, de-ionized water (500 ml) was poured into each bucket such that all of the waste rock was exposed to the water. Sample effluents were collected from each bucket and tested for pH, temperature, and concentration of dissolved zinc. The data are reported in Table IV and FIGS. 1 and 2.

TABLE IV

Zinc Concentration in Leachate of Controls and an Embodiment of this Invention

| Day | Control Bucket #1 | Control Bucket #2 | Control Bucket #3 | Invention Bucket #4 |
|---|---|---|---|---|
| 0 | 55 | 2.50 | 55.00 | 2.04 |
| 7 | 50 | 1.50 | 25 | 0.24 |
| 12 | n/a | n/a | n/a | n/a |
| 22 | 0.84 | 0.72 | 0.06 | 0.08 |
| 26 | 0.90 | 1.22 | 0.06 | 0.27 |
| 28 | 1.05 | 0.92 | 0.18 | 0.30 |
| 33 | 0.84 | 0.62 | 0.20 | 0.18 |
| 37 | 0.74 | 0.60 | 0.18 | 0.24 |
| 42 | 0.80 | 0.56 | 0.12 | 0.22 |
| 46 | 0.70 | 0.94 | 0.00 | 0.22 |
| 49 | 0.78 | 0.82 | 0.06 | 0.18 |
| 53 | 0.48 | 0.32 | 0.01 | 0.16 |
| 57 | 0.60 | 0.48 | 0.08 | 0.12 |
| 60 | 0.40 | 0.72 | 0.02 | 0.20 |
| 62 | 0.62 | 0.54 | 0.00 | 0.14 |
| 64 | 0.54 | 0.76 | 0.02 | 0.16 |
| 67 | 0.40 | 0.52 | 0.10 | 0.16 |
| 69 | 0.34 | 1.25 | 0.02 | 0.14 |
| 75 | 0.22 | 0.22 | 0.06 | 0.12 |
| 78 | 0.22 | 0.50 | 0.00 | 0.10 |
| 82 | 0.08 | 0.44 | 0.18 | 0.08 |
| 85 | 0.32 | 0.42 | 0.06 | 0.12 |
| 89 | 0.30 | 0.24 | 0.02 | 0.12 |
| 92 | 0.08 | 0.26 | 0.06 | 0.18 |
| 97 | 0.14 | 0.58 | 0.06 | 0.08 |
| 104 | 0.02 | 0.30 | 0.03 | 0.10 |
| 111 | 0.04 | 0.20 | 0.04 | 0.10 |
| 116 | 0.34 | 0.64 | 0.06 | 0.12 |
| 123 | 0.42 | 0.62 | 0.02 | 0.12 |
| 132 | 0.18 | 0.44 | 0.02 | 0.10 |
| 139 | 0.22 | 0.44 | 0.02 | 0.08 |
| 146 | 0.22 | 0.22 | 0.02 | 0.12 |
| 153 | 0.21 | 0.44 | 0.03 | 0.08 |
| 160 | 0.42 | 0.64 | 0.04 | 0.12 |
| 167 | 0.22 | 1.10 | 0.06 | 0.12 |
| 174 | 0.30 | 1.70 | 0.10 | 0.08 |
| 181 | 0.32 | 1.86 | 0.01 | 0.12 |

TABLE IV-continued

Zinc Concentration in Leachate of Controls and an Embodiment of this Invention

| Day | Control Bucket #1 | Control Bucket #2 | Control Bucket #3 | Invention Bucket #4 |
|---|---|---|---|---|
| 188 | 0.20 | 1.72 | 0.18 | 0.14 |
| 203 | 0.22 | 1.76 | 0.04 | 0.12 |
| 210 | 0.00 | 1.20 | 0.02 | 0.05 |
| 216 | 1.11 | 0.07 | 0.09 | 0.05 |
| 235 | 0.72 | 4.02 | 0.22 | 0.26 |
| 244 | 0.40 | 3.26 | 0.00 | 0.06 |
| 257 | 0.36 | 1.74 | 0.02 | 0.10 |
| 271 | 0.40 | 1.86 | 0.08 | 0.08 |
| 297 | 0.40 | 2.28 | 0.02 | 0.08 |
| 311 | 0.40 | 3.86 | 0.02 | 0.02 |
| 321 | 0.38 | 3.08 | 0.02 | 0.02 |
| 334 | 0.38 | 1.90 | 0.02 | 0.02 |
| 353 | 0.38 | 2.80 | 0.00 | 0.02 |
| 372 | 0.64 | 1.42 | 0.00 | 0.00 |
| 402 | 0.48 | 0.88 | 0.39 | 0.01 |
| Total | 125.77 | 58.1 | 83.1 | 8.14 | n/a = Not Analyzed

These data illustrate the feasibility and benefit of treating waste rock having a pH of less than about 5.0 with a neutralizing agent prior to treatment with the polymer solution. These data also demonstrate the decrease in the leaching of zinc values from the waste rock after treatment with the neutralizing solution and the polymer.

TABLE V pH of Leachate of Controls and an Embodiment of this Invention

| Day | Control Bucket #1 | Control Bucket #2 | Control Bucket #3 | Invention Bucket #4 |
|---|---|---|---|---|
| 0 | 1.95 | 2.06 | 10.34 | 12.14 |
| 7 | 2.54 | 2.53 | 9.24 | 10.89 |
| 12 | 2.21 | 2.28 | 8.48 | 10.82 |
| 22 | 1.82 | 1.92 | 6.83 | 9.98 |
| 26 | 2.21 | 2.30 | 6.10 | 9.73 |
| 28 | 2.60 | 2.69 | 5.75 | 9.31 |
| 33 | 2.21 | 2.35 | 5.81 | 9.44 |
| 37 | 2.35 | 2.31 | 5.77 | 9.31 |
| 42 | 2.43 | 2.47 | 5.51 | 9.28 |
| 46 | 2.30 | 2.29 | 5.45 | 9.09 |
| 49 | 2.31 | 2.33 | 5.34 | 9.08 |
| 53 | 2.79 | 2.85 | 5.89 | 8.78 |
| 57 | 2.85 | 2.92 | 6.41 | 8.31 |
| 60 | 2.81 | 2.81 | 6.64 | 8.67 |
| 62 | 2.80 | 2.85 | 4.99 | 8.98 |
| 64 | 2.50 | 2.56 | 4.72 | 8.88 |
| 67 | 2.81 | 2.93 | 4.61 | 8.41 |
| 69 | 2.71 | 2.71 | 5.14 | 8.59 |
| 75 | 2.73 | 2.82 | 4.21 | 8.83 |
| 78 | 2.60 | 2.73 | 6.07 | 6.67 |
| 82 | 2.57 | 2.60 | 4.26 | 6.47 |
| 85 | 2.88 | 2.89 | 5.91 | 7.01 |
| 89 | 2.71 | 2.80 | 4.42 | 8.95 |
| 92 | 2.59 | 2.62 | 1.77 | 4.57 |
| 97 | 2.77 | 2.84 | 4.39 | 8.96 |
| 104 | 2.56 | 2.68 | 8.48 | 8.08 |
| 111 | 2.76 | 2.81 | 4.81 | 7.00 |
| 116 | 2.01 | 2.15 | 5.62 | 6.82 |
| 123 | 2.50 | 2.50 | 4.18 | 6.80 |
| 132 | 2.70 | 2.78 | 4.19 | 7.06 |
| 139 | 2.89 | 2.84 | 4.45 | 7.11 |
| 146 | 2.78 | 2.82 | 4.41 | 7.22 |
| 153 | 2.86 | 3.02 | 4.41 | 7.24 |
| 160 | 2.75 | 2.81 | 4.68 | 6.62 |
| 167 | 2.62 | 2.64 | 4.18 | 6.76 |
| 174 | 2.91 | 2.96 | 4.56 | 6.79 |
| 181 | 2.93 | 2.98 | 5.98 | 7.38 |
| 188 | 3.57 | 3.56 | 4.99 | 7.21 |
| 203 | 2.89 | 2.93 | 4.53 | 7.27 |
| 210 | 2.56 | 2.66 | 3.92 | 6.22 |
| 216 | 2.25 | 2.10 | 4.03 | 5.64 |
| 235 | 2.60 | 2.66 | 4.79 | 8.20 |
| 244 | 2.40 | 2.42 | 4.43 | 8.53 |
| 257 | 2.33 | 2.18 | 3.50 | 8.12 |
| 271 | 2.84 | 2.87 | 5.28 | 8.60 |
| 297 | 2.62 | 2.55 | 3.99 | 7.85 |
| 311 | 2.62 | 2.61 | 3.92 | 8.01 |
| 321 | 3.09 | 3.05 | 4.35 | 8.27 |
| 334 | 2.68 | 2.63 | 5.47 | 8.70 |
| 353 | 2.81 | 2.76 | 4.16 | 7.81 |
| 372 | 3.09 | 2.99 | 4.38 | 7.54 |
| 402 | 2.73 | 2.66 | 4.29 | 8.12 |

These data demonstrate the maintenance of pH after treatment with the neutralizing solution and the polymer.

The foregoing description and examples are for the purpose of illustration only, and do not limit the scope of protection which should be accorded this invention.

What is claimed is:

1. A process for retarding the leaching of metal values other than strontium from waste rock, the waste rock having a leachate with a pH in excess of 5.0 formed when water contacts the rock, the process comprising coating the waste rock with a polymer having active sites for the metal values contained therein such that the active sites of the polymer chemically adhere to the metal values present in the waste rock.

2. A process for retarding the erosion of metal values other than strontium from waste rock, said waste rock having a leachate with a pH less than about 5.0 being formed when water contacts the rock, the process comprising:

A. treating the waste rock with a neutralizing agent to raise the pH of the waste rock environment; and B. coating the treated waste rock with a polymer having active sites for the metal values contained therein such that the active sites of the polymer chemically adhere to the metal values present in the waste rock.

3. The process of claim 1 wherein the metal values are selected from the group consisting essentially of magnesium, manganese, zinc and calcium.

4. The process of claim 2 wherein the metal values are selected from the group consisting essentially of magnesium, manganese, zinc and calcium.

* * * * *